Jan. 24, 1928.　　　　　　　　　　　　　　　　　　1,657,229
F. SFERLAZZO
BRUSH OPERATING APPARATUS
Filed Nov. 29, 1926　　　　2 Sheets-Sheet 1
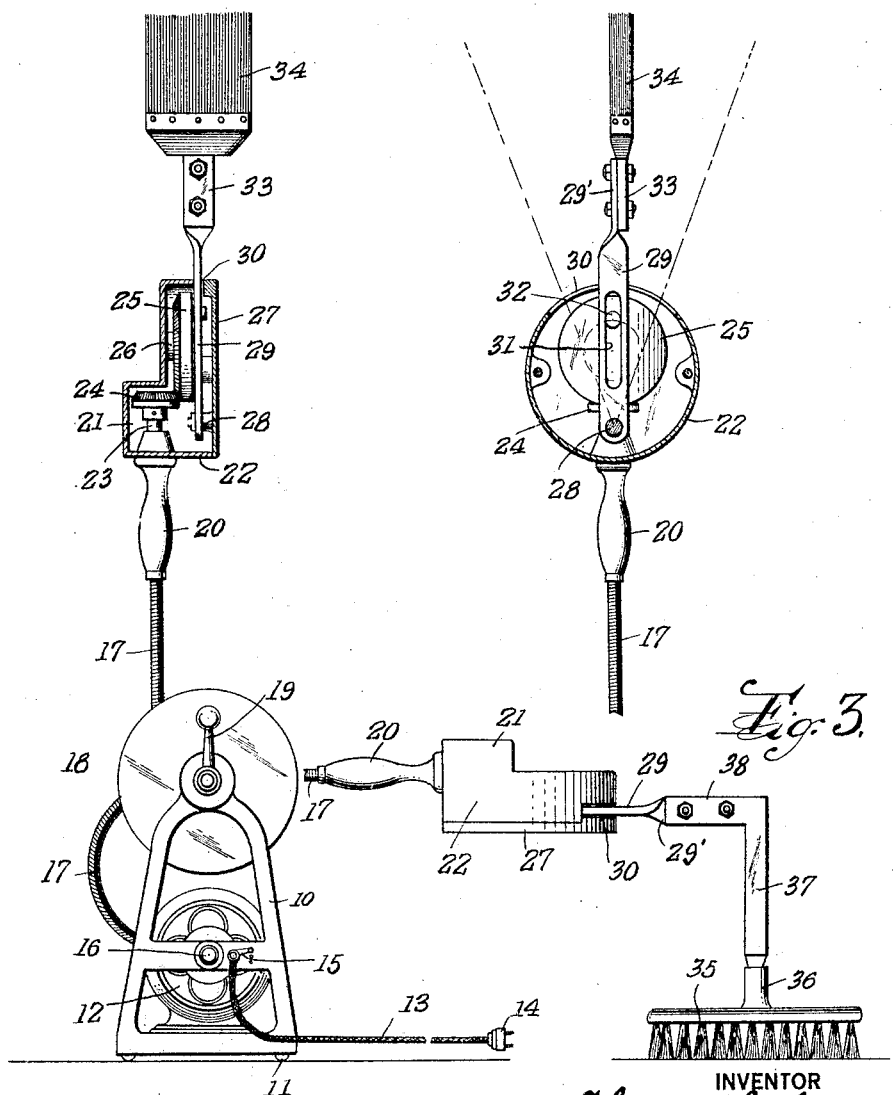
INVENTOR
Filippo Sferlazzo
BY
Frank C. Fischer
ATTORNEY

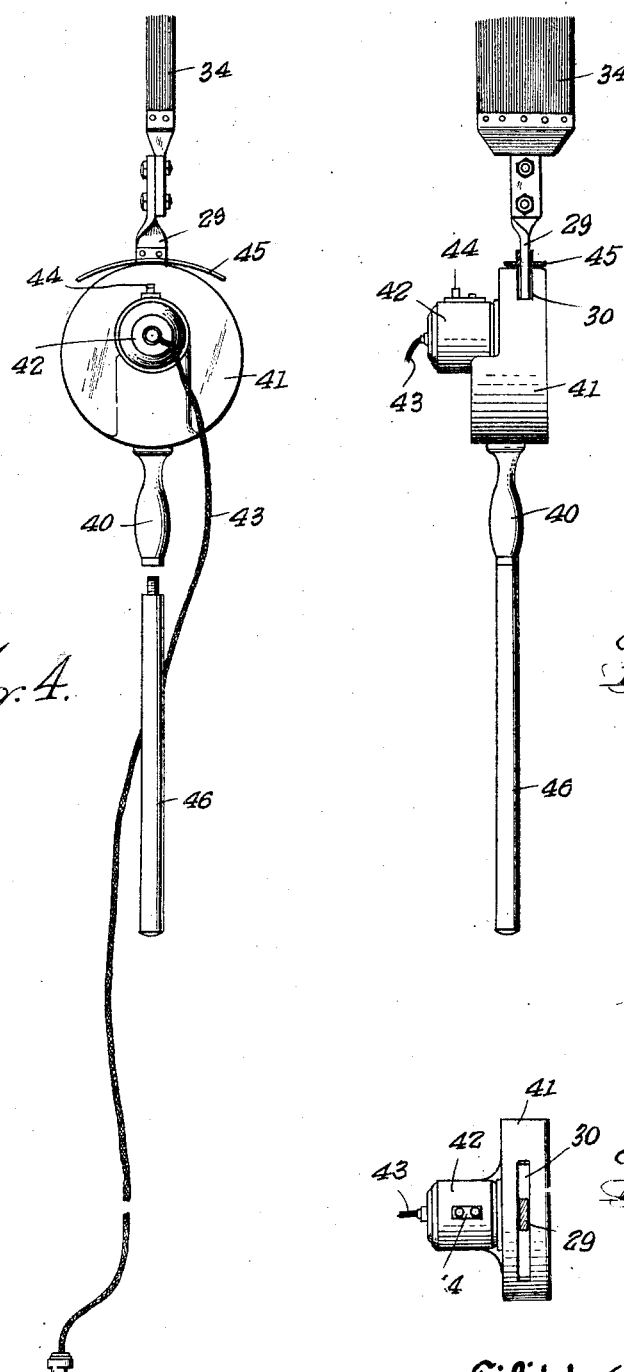

Patented Jan. 24, 1928.

1,657,229

UNITED STATES PATENT OFFICE.

FILIPPO SFERLAZZO, OF NEWARK, NEW JERSEY.

BRUSH-OPERATING APPARATUS.

Application filed November 29, 1926. Serial No. 151,583.

This invention relates to devices for operating brushes and similar applicators over surfaces and more particularly to brushes used in applying paints, etc., and for cleaning flat surfaces.

In performing such operations it is the usual practice to grasp the brush by its handle and give it a reciprocatory swaying motion over the surface to be treated, this action being accomplished manually and if long continued, it becomes exceedingly tedious and fatiguing.

It is therefore one object of the present invention to provide mechanical means for transmitting an oscillatory motion to a brush whereby it is caused to move reciprocatingly over a surface, the brush being supported, guided and pressed against the surface by hand in an easy and convenient manner.

It is a further feature to combine with the mechanism a driving means which entirely relieves the muscular strain upon the wrist of an operator and which is under ready control as to stopping, starting and speed of movement.

These and other advantageous aims, such as portability, simplicity and wide field of application, are secured by the novel construction, arrangement and combination of parts hereinafter described and shown in the accompanying drawings, forming a material part of this disclosure, and in which:—

Figure 1 is a side elevational view of one form of an embodiment of the invention, parts being broken away to show the construction.

Figure 2 is a similar view taken in a plane at a right angle to Figure 1, the motor stand being omitted and certain parts shown in section.

Figure 3 is a side elevational view of the device as applied to a scrub brush.

Figure 4 is a front view of a modified form of the apparatus having a direct connected motor.

Figure 5 is a side view of the same.

Figure 6 is a top plan or end view thereof, the brush handle being shown in section.

In Figure 1 is shown a stand 10 composed of two upright frames resting on spherical rolls or casters 11 and having a platform near its bottom on which is secured an electric motor 12 furnished with current through a cable 13 provided with a connection plug 14 engageable with any convenient supply source, the speed of the motor being controlled by a step switch 15 or equivalent device of ordinary type.

Driven by the motor spindle 16 is a flexible shaft 17 normally coiled about a drum 18 fixed on a spindle journalled in the frames at the top of the stand and provided with a lever handle 19 by which the drum may be rotated.

The opposite end of the flexible shaft 17 is connected to a spindle rotatably mounted in a handle 20 rigidly fixed in a projection 21 extending from one side of a hollow cylindrical casing 22 into which the end of the spindle 23 reaches.

Fixed on the end of the spindle 23 is a bevel pinion 24 meshing with a mating gear 25 rotatable on a stem 26 within the casing.

Attached to the opposite side of the casing is a circular cover 27 held by screws entering lugs in the casing as shown.

Extending into the casing from the cover, near the edge adjacent the handle, is a boss 28 on which is pivotally mounted a flat lever 29, this lever extending out of the casing through a slot 30 in its periphery opposite the handle.

Midway in the length of the lever 29 is an elongated slot 31 receptive of a crank-pin 32 fixed in the back of the bevel gear 25, the arrangement being such that the lever is oscillated by rotation of the gear in an obvious manner.

The outer end of the lever 29 is twisted at a right angle, as at 29' and provided with openings to receive bolts by which the stem or stub handle 33 of a brush may be rigidly secured and thus caused to move reciprocatively, as indicated by the broken line in Figure 2, upon the application of power.

The type of brush indicated by the numeral 34 is adapted for flat perpendicular surfaces, as the walls of buildings and the like in applying paint or other coatings, whereas the brush 35 is intended for operating on floors or other horizontal surfaces, as in scrubbing and like operations.

To this end the brush backing is provided with a socket 36, in which may be engaged an arm 37 extending at a right angle from an arm 38 adapted to be bolted to the end of the lever 29 in the manner before described.

In the modification shown in Figures 4 to 6, a handle 40 is fixed to a hollow cylindrical casing 41 in which is mounted the lever 29 carrying a brush 34 in the manner previously described.

A motor 42 is fixed on the side of the casing and furnished with current through the cable 43, the motor being supplied with a push button control switch 44.

The inner end of the motor shaft has secured to it a disc in which is fixed a crank pin to operate in the lever slot 31 whereby oscillations of the brush are obtained, this device not being shown as it is a mere repetition of parts already explained.

Such brushes are sometimes used for overhead surfaces and in order to prevent paint or like liquids from entering the casing through the open slot in which the lever 29 operates, an arcuate guard plate 45 is fixed to the lever so that at no time can drippings enter, some part of the guard being at all times thereover.

In order to reach overhead horizontal surfaces at a considerable height there is provided an extension bar 46 engageable with the end of the brush handle whereby such operations are facilitated.

From the foregoing it will be seen that a practical apparatus for manipulating a brush has been disclosed that is easily managed and with far less fatigue than where an operator must move the brush manually to and fro, as well as supply the requisite pressure and direct the same over a surface.

While certain preferred embodiments of this device have been shown and described, it will be understood that changes in the form, arrangements, proportions, sizes and details thereof may be made without departing from the scope of the invention as defined in the appended claims.

Having thus described my invention, what I claim as new and desire to secure by Letters Patent, is:—

1. A brushing device comprising a handled casing, a lever pivoted in said casing and extending therebeyond, an elongated slot in said lever, a brush removably engaged with the projecting end of said lever, a bevel pinion in said casing, a power driven flexible shaft extending through the handle to drive said pinion, a bevel gear meshed with said pinion, a stud set eccentrically in said gear, engaging in the slot to actuate said lever, and means for controlling said actuating means.

2. A brushing device comprising a cylindrical casing having a peripheral slot, a handle on said casing opposite the slot, a lever pivoted at one end in said casing and extending outward through the slot in offset relation with the handle, a brush removably engaged with the extending end of said lever, a guard carried by said lever to cover the slot, and power driven means in said casing to oscillate said lever and brush.

This specification signed and witnessed this 27th day of November, 1926.

FILIPPO SFERLAZZO.